United States Patent
Fauni

(10) Patent No.: US 9,863,327 B2
(45) Date of Patent: Jan. 9, 2018

(54) INTAKE MANIFOLD WITH INTEGRATED CHARGE AIR COOLER WITH TWO CIRCUITS

(71) Applicant: Röchling Automotive SE & Co. KG, Mannheim (DE)

(72) Inventor: Claudio Fauni, Laives (IT)

(73) Assignee: RÖCHLING AUTOMOTIVE SE & CO. KG, Mannheim (DE)

(*) Notice: Subject to any disclaimer, the term of this patent is extended or adjusted under 35 U.S.C. 154(b) by 46 days.

(21) Appl. No.: 14/623,118

(22) Filed: Feb. 16, 2015

(65) Prior Publication Data

US 2015/0233281 A1 Aug. 20, 2015

(30) Foreign Application Priority Data

Feb. 18, 2014 (DE) .................. 10 2014 202 971

(51) Int. Cl.
| | |
|---|---|
| *F02B 31/08* | (2006.01) |
| *F02D 9/02* | (2006.01) |
| *F02B 29/04* | (2006.01) |

(Continued)

(52) U.S. Cl.
CPC ............ *F02D 9/02* (2013.01); *F02B 29/0406* (2013.01); *F02B 29/0412* (2013.01);
(Continued)

(58) Field of Classification Search
CPC ................. F02B 29/02; F02B 29/0412; F02D 2009/0279
(Continued)

(56) References Cited

U.S. PATENT DOCUMENTS 4,520,775 A * 6/1985 Nakamura ............ F02F 1/4214
123/184.45
4,959,961 A * 10/1990 Hiereth ............... F02B 29/0412
123/432

(Continued)

FOREIGN PATENT DOCUMENTS

| | | |
|---|---|---|
| DE | 1996192 C2 | 4/2003 |
| DE | 102005052422 A1 | 5/2007 |

(Continued)

OTHER PUBLICATIONS

Search Report issued for German patent application No. 10 2014 202 971.6 dated Oct. 13, 2014, with machine English translation, 16 pages.

*Primary Examiner* — Sizo Vilakazi
*Assistant Examiner* — Kevin R Steckbauer
(74) *Attorney, Agent, or Firm* — Rothwell, Figg, Ernst & Manbeck, P.C.

(57) ABSTRACT

An intake device is provide for drawing in fresh gas and feeding the same to an internal combustion engine with internal combustion, wherein the intake device is suited for the formation of a fresh gas vortex in a combustion chamber of the internal combustion engine. The intake device includes a first manifold section, from which all first parts of fresh gas line groups branch off to a fresh gas outlet end, and a second manifold section, from which all second parts of the fresh gas line groups branch off to the fresh gas outlet end, which are fluidically separated from each other from the separation point to the fresh gas outlet end. A vortex throttle assembly is provided in a first manifold section and the amount throttle device is provided in the second manifold section.

13 Claims, 2 Drawing Sheets

(51) Int. Cl.
   *F02M 35/10* (2006.01)
   *F02M 35/108* (2006.01)
(52) U.S. Cl.
   CPC ..... *F02B 29/0418* (2013.01); *F02M 35/1085* (2013.01); *F02M 35/10262* (2013.01); *F02B 31/085* (2013.01); *F02D 2009/0279* (2013.01); *Y02T 10/146* (2013.01)
(58) Field of Classification Search
   USPC .................................................. 123/308, 432
   See application file for complete search history.

(56) References Cited

U.S. PATENT DOCUMENTS

| | | | | |
|---|---|---|---|---|
| 6,055,958 | A * | 5/2000 | Aoyama | F02B 31/087 123/184.55 |
| 6,520,146 | B2 * | 2/2003 | Laimbock | F02B 17/00 123/184.45 |
| 7,086,457 | B2 * | 8/2006 | Kienbock | F28F 13/003 165/148 |
| 7,587,898 | B2 * | 9/2009 | Turner | F01N 13/107 123/432 |
| 8,090,521 | B2 * | 1/2012 | Goes | F02D 41/0082 123/435 |
| 8,286,615 | B2 | 10/2012 | Dehnen et al. | |
| 2008/0216474 | A1 * | 9/2008 | Turner | F01N 13/107 60/599 |
| 2011/0088663 | A1 | 4/2011 | Dehnen et al. | |
| 2014/0345566 | A1 * | 11/2014 | Lallemant | F02B 29/0418 123/434 |
| 2014/0352656 | A1 * | 12/2014 | Kolhouse | F02B 31/085 123/308 |
| 2014/0360462 | A1 * | 12/2014 | Lallemant | F02B 29/0418 123/336 |

FOREIGN PATENT DOCUMENTS

| | | |
|---|---|---|
| DE | 102009050258 B3 | 11/2010 |
| DE | 102010036592 A1 | 1/2012 |
| JP | S60-88821 A | 5/1985 |
| WO | 2010/146063 A1 | 12/2010 |

* cited by examiner

INTAKE MANIFOLD WITH INTEGRATED CHARGE AIR COOLER WITH TWO CIRCUITS

CROSS REFERENCE TO RELATED APPLICATION(S)

This application claims priority to German Application No. 10 2014 202 971.6, filed Feb. 18, 2014. The entirety of the disclosure of the above-referenced application is incorporated herein by reference.

BACKGROUND OF THE INVENTION

1. Field of the Invention

The invention concerns an intake device for drawing in fresh gas and feeding the same to an internal combustion engine with internal combustion, wherein the intake device is suited for the formation of a fresh gas vortex in a combustion chamber of the internal combustion engine and comprises:
  a fresh gas inlet end farthest from the internal combustion engine in a fully assembled state,
  a fresh gas outlet end nearest to the internal combustion engine in a fully assembled state,
  a fresh gas heat exchanger for transmission of thermal energy between the fresh gas and a heat exchanger medium flowing through the fresh gas heat exchanger provided between the fresh gas inlet end and the fresh gas outlet end,
  an inlet-side fresh gas line for feeding fresh gas from the fresh gas inlet end to the fresh gas heat exchanger,
  an amount throttle device, which is configured for the purpose of modifying the fresh gas flow, which flows per time unit from the fresh gas inlet end to the fresh gas outlet end during operation of the intake device,
  a plurality of separate outlet-side fresh gas lines configured for feeding fresh gas in the direction from the fresh gas heat exchanger to the individual combustion chambers of the internal combustion engine, wherein a fresh gas line group is provided with at least two separate outlet-side fresh gas lines for each combustion chamber to be supplied with fresh gas by the intake device, and
  a vortex throttle assembly configured for the modification of the fresh gas flow, which flows per time unit through a first part of the outlet-side fresh gas lines of each fresh gas line group during operation of the intake device,
wherein a fresh gas flow, which flows per time unit through a second part of the outlet-side fresh gas lines of each fresh gas line group, which is different from the first part, can be modified during operation of the intake device by actuating the amount throttle device.

2. Background of the Related Art

An intake device of this kind is used in motor vehicles of the Opel® and Chevrolet® and BMW® brands. Such intake devices are produced and sold, for example, by the companies Magnetti Marelli, Mann & Hummel or also Mahle.

In order to influence the formation of the mixture for the internal combustion engine, which is to be ignited, the fresh gas flow in the combustion chambers of the internal combustion engine can be controlled via a control of the vortex throttle assembly in the known intake devices in such a way that it is basically symmetrically fed, in the extreme case via the first and second part of the outlet-side fresh gas lines, in equal parts into the combustion chamber, which basically prevents the formation of a vortex. In another extreme case, the first part of the outlet-side fresh gas lines is closed by means of the vortex throttle assembly or its flow cross section is minimized, so that the fresh gas is exclusively or at least predominantly asymmetrically delivered via the second part of the outlet-side fresh gas lines to the individual combustion chambers, whereby the fresh gas mass flow into the combustion chambers receives a helical spin running around the stroke movement axis of the piston. This vortex forming process is also frequently called "swirl process," in contrast to another vortex forming process called "tumble process," in which a spin of the fresh gas is produced around an axis that is basically orthogonal with respect to the stroke movement axis.

It is disadvantageous for the known intake devices that a throttle valve is provided in each first outlet-side fresh gas line, which represents an undesirably large expenditure for production and assembly. This expenditure is further increased by the fresh gas heat exchanger provided in the generic intake device, which generally produces a charge air cooling. Only an extremely limited installation space is available for the realization of the vortex formation in the intake device due to the provision of the charge air cooling, since the overall dimensions of the intake device are predetermined, in turn, by the installation space provided in the engine compartment.

Reference is made, for example, to WO 2010/146063 A1 or also DE 10 2009 050 258 B3 with regard to the further background of the prior art of charge air cooling. With regard to an alternative realization of a vortex formation, however without a valve system and without a disclosed charge air cooling, document DE 10 2005 05 2422 A1 should be mentioned.

SUMMARY OF THE INVENTION

It is an object of the invention to simplify the expenditure for the production and assembly of the generic intake device, while retaining the same efficiency with regard to vortex formation and its adjustability as well as charge air cooling.

This object is attained according to the invention with an intake device of the initially mentioned kind in that a first manifold section, from which all first parts of the fresh gas line groups branch off to the fresh gas outlet end, and a second manifold section, from which all second parts of the fresh gas line groups branch off to the fresh gas outlet end, are fluidically separated from each other from the separation point to the fresh gas outlet end in such a way, starting at a downstream separation point and up to the fresh gas outlet end, that the first manifold section and all other first parts of the fresh gas line groups form a first flow chamber and the second manifold section and all second parts of the fresh gas line groups form a second flow chamber, wherein the vortex throttle assembly is provided in a first manifold section and the amount throttle device is provided in the second manifold section.

With this embodiment of the intake device it is possible to make do with a single throttling device, for example, a throttle valve, for the first or second part of the fresh gas line groups with the amount throttle device as well as also with the vortex throttle assembly. The fresh gas mass flow in the individual parts of the fresh gas line groups is thus quantitatively modified according to the invention in the manifold section and reaches the parts of the outlet-side fresh gas lines already directly quantitatively adjusted by means of the amount throttle device or vortex throttle assembly located fluidically upstream. The activated fluidic separation of the manifold sections as well as the first and second parts of the fresh gas line groups from each other is therefore necessary in order to maintain the flow control/regulation up to the inflow of the fresh gas partial flows formed in this way into the combustion chambers by means of the amount throttle device and the vortex throttle assembly.

The following should be clarified:
Where it is stated above that the vortex throttle assembly is configured for swirling the fresh gas flow that flows through a first part of the outlet-side fresh gas lines and where it is further stated that the fresh gas flow flowing through a second part of the outlet-side fresh water lines, which is different from the first part, can be modified by actuating the amount throttle device, this does not mean by implication that the actuation of the amount throttle device would not also have a repercussion on the fresh gas flow flowing through the first part of the fresh gas lines or that an activation of the vortex throttle assembly would not also have a repercussion on the fresh gas flow flowing through the second part of the fresh gas lines. This applies to the prior art as well as also to the invention. This is because the fresh gas flow requirement is basically determined by the intake stroke of the cylinders of the internal combustion engine. The fresh gas flow—aside from the different flow induced losses—is increased or reduced in the respective other part of the fresh gas lines by the amount by which the fresh gas flow is reduced or increased in one part of the outlet-side fresh gas lines by actuating the allocated throttle device or throttle assembly.

The vortex throttle assembly is preferably configured for the purpose of modifying the effective flow cross section of the first manifold section, but not that of the second manifold section. It is likewise preferred if the amount throttle device is configured for the purpose of modifying the effective flow cross section of the second manifold section, but not that of the first manifold section.

The design solution of the above-presented intake device according to the invention leads to the fact that the effective flow cross section of the first manifold section at the attachment point of the vortex throttle assembly is minimized with the vortex throttle assembly, preferably a flow in the first manifold section is prevented, if the formation of a vortex is desired, and the entire fresh gas flow control/regulation takes place by actuating the amount throttle device.

However, if the formation of a vortex is not desired, the fresh gas flow control/regulation takes place by means of a mutual and simultaneous actuation of the amount throttle device and the vortex throttle assembly.

The application relates for this reason also to an operating procedure for an intake device according to the invention, according to which a fresh gas flow control/regulation takes place exclusively by actuating the amount throttle device, while the vortex throttle assembly minimizes the flow cross section of the first manifold section at its attachment point, if the formation of a vortex in a connected internal combustion engine is desired, and a fresh gas flow control/regulation takes place by means of the joint actuation of the vortex throttle assembly and the amount throttle device, if the connected internal combustion engine does not require the formation of a vortex.

The fresh gas heat exchanger is advantageously arranged as close as possible to the fresh gas outlet end closest to the internal combustion engine, so that the cooled fresh gas flowing downstream from the fresh gas heat exchanger to the internal combustion engine is exposed for as little time as possible to the internal combustion engine as heat source and an undesirable reheating of the initially cool fresh gas can be prevented.

It is advantageous for this reason if the separation point is located upstream of the fresh gas heat exchanger, so that the inlet-side fresh gas line features a first partial fresh gas line as part of the first manifold section and a second inlet-side partial fresh gas line as part of the second manifold section, wherein the vortex throttle assembly is provided in the first partial fresh gas line and the amount throttle device is provided in the second partial fresh gas line. The first and second partial fresh gas lines are preferably located respectively upstream of the fresh gas heat exchanger.

It should basically also not be ruled out that the fresh gas heat exchanger is located in a common flow chamber upstream of the separation point, so that the first and second partial fresh gas lines are positioned downstream of the fresh gas heat exchanger. The flow path of the fresh gas from the fresh gas heat exchanger up to the internal combustion engine can then indeed be longer than in the above-mentioned preferred case, with the correspondingly increased risk of reheating of the already cooled fresh gas. However, the entire fresh gas heat exchanger is available in this embodiment for the cooling of the fresh gas flow delivered overall per time unit to the internal combustion engine. In the above described preferred case, instead, one part of the fresh gas heat exchanger capacity that is made available is no longer used or is used only to a lesser extent in some instances by the flow regulation of the partial flows of fresh gas occurring upstream thereof.

The formation of separate flow chambers, that is, the above-mentioned first and second flow chambers, can be easily constructively attained in that the separation point is located upstream of the fresh gas heat exchanger, so that a heat exchanger housing that accommodates the fresh gas heat exchanger features a first partial housing, which is part of the first flow chamber, and a second partial housing, which is part of the second flow chamber.

The first and second partial housings can have, for example, a shared separation wall or can be configured fully separate from each other.

In order to ensure that fresh gas can be cooled in both flow chambers, it can be provided that the fresh gas heat exchanger has at least one heat exchanger surface for exchange of heat between the fresh gas and the heat exchanger medium positioned in flow direction of the heat exchanger medium between a heat exchanger medium inflow into the heat exchanger housing and a heat exchanger medium outflow out of the heat exchanger housing, of which surface a first section is positioned in the first partial housing and a second section connected to the first section is positioned in the second partial housing. In this embodiment of the invention, the first and second flow chambers thus share the heat exchanger surface positioned between the heat exchanger medium inflow and the heat exchanger medium outflow.

This can be realized according to another advantageous constructive specification in that the fresh gas heat exchanger has at least one line for transport of heat exchanger medium, which has a first line section extending within the first partial housing, a second line section extending within the second partial housing, and a connecting line section connecting the first and second line sections, wherein one line section out of the first and second line section features the heat exchanger medium inflow, and the respective other line section features the heat exchanger medium outflow.

In the case of an existing shared separation wall, which separates the first and second partial housing from each other, the connecting line section is forced through the shared separation wall. The heat exchanger housing is forced through the connecting line section of each housing wall of a partial housing in the case of the separate configuration of the first and second partial housing of the heat exchanger housing.

As an alternative to increase the possible cooling capacity and/or to adjust a different cooling capacity in the two partial housings it can be provided that the fresh gas heat exchanger comprises a first and a second partial fresh gas heat exchanger, of which each features at least one heat exchanger surface positioned in flow direction of the heat exchanger medium flow between a heat exchanger medium inflow into a partial housing and a heat exchanger medium outflow out of said partial housing for exchange of heat between the fresh gas and the heat exchanger medium, wherein the heat exchanger surface of the first partial fresh gas heat exchanger is positioned as first heat exchanger surface in the first partial housing and the heat exchanger surface of the second partial fresh gas heat exchanger is positioned as second heat exchanger surface in the second partial housing. This embodiment leads however to clearly greater production costs in contrast to the previously discussed ones.

Then, if no vortex formation is desired, that is, if fresh gas flows as a rule in the first as well as also in the second flow chamber to the fresh gas outlet end, it is advantageous for the operation of the intake device if an amount actuation device for actuation of the amount throttle device and a vortex control device for actuation of the vortex throttle assembly are provided, wherein a synchronization device can further be advantageously provided, which is configured for synchronization in the same direction of actuation of the amount throttle device and the vortex throttle assembly in an operating condition in which fresh gas flows into the first flow chamber as well as also into the second flow chamber toward the fresh gas outlet end. This synchronization device makes possible approximately equal fresh gas flows flow per time unit through each of the two flow chambers toward the fresh gas outlet end.

It is sufficient in reality if the synchronization device is configured for the purpose of ensuring that the value of the ratio of the fresh gas flow speeds prevailing at the respective attachment points of the amount throttle device and the vortex throttle assembly at an operating time point is within a value range of no more than ±20%, preferably no more than ±10%, particularly preferably no more than ±5% of the value of the ratio of the flow cross sections of the respective manifold sections present at the respective attachment points of the vortex throttle assembly and the amount throttle device at the same operating time point. Since it can be constructively ensured that the vacuum pressure generated by the internal combustion engine starting at the fresh outlet end is approximately identical in both flow chambers, the respective flowing fresh gas flow speeds at the attachment points of the amount throttle device or the vortex throttle assembly behave inversely as the flow cross sections of the respective manifold sections of the flow chambers.

BRIEF DESCRIPTION OF THE DRAWING FIGURES

The invention will be explained in further detail with the aid of the enclosed drawings, wherein.

DETAILED DESCRIPTION OF THE PREFERRED EMBODIMENTS

Figure 1:
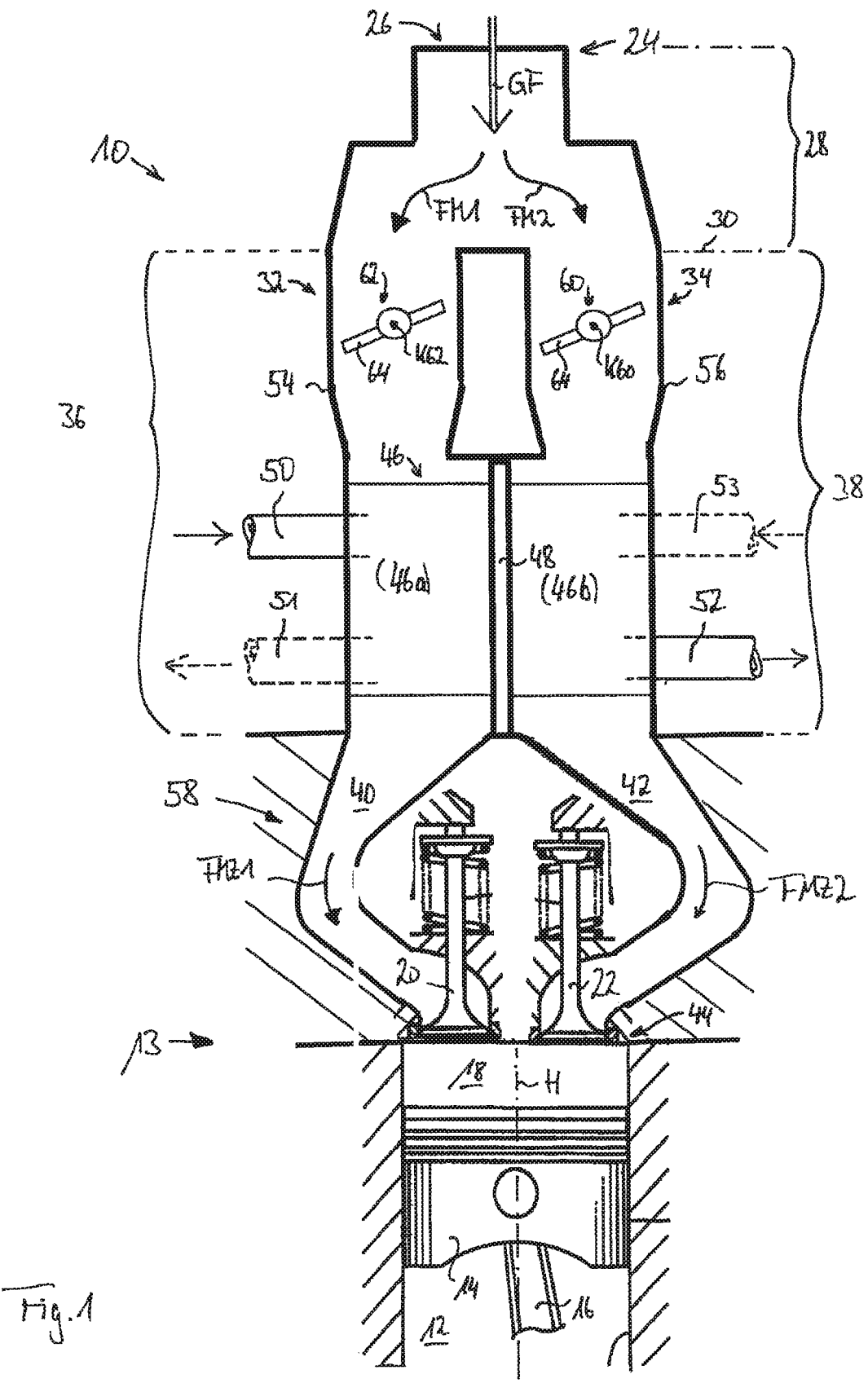
FIG. 1 shows an exemplary schematic longitudinal section through an intake device according to an aspect of the invention mounted on an internal combustion engine.

An embodiment of an intake device according to the invention is identified overall with reference numeral 10 in FIG. 1. This intake device is in fluidic connection with a cylinder 12 of an internal combustion engine 13, in which a piston 14 can be movably accommodated along a stroke movement axis H. The piston 14 is connected in a known manner to a crankshaft via a connecting rod 16. Fresh gas can be introduced past two separate inlet valves 20 and 22 into the combustion space or the combustion chamber 18 of the cylinder 12.

The intake device 10 serves to deliver fresh gas into the combustion space or into the combustion chamber 18 and into further combustion spaces of other cylinders of the internal combustion engine 13, which are not represented in FIG. 1.

The intake device 10 according to the invention has an opening 26 at its fresh gas inlet end 24, which is farthest from the internal combustion engine, through which fresh gas can flow into the intake device 10 (see the total fresh gas mass flow indicated by the arrow GF in the area of the opening 26).

The vacuum pressure required to draw in the fresh gas mass flow is generated by the piston 14 during the intake stroke of the internal combustion engine 13.

Figure 2:
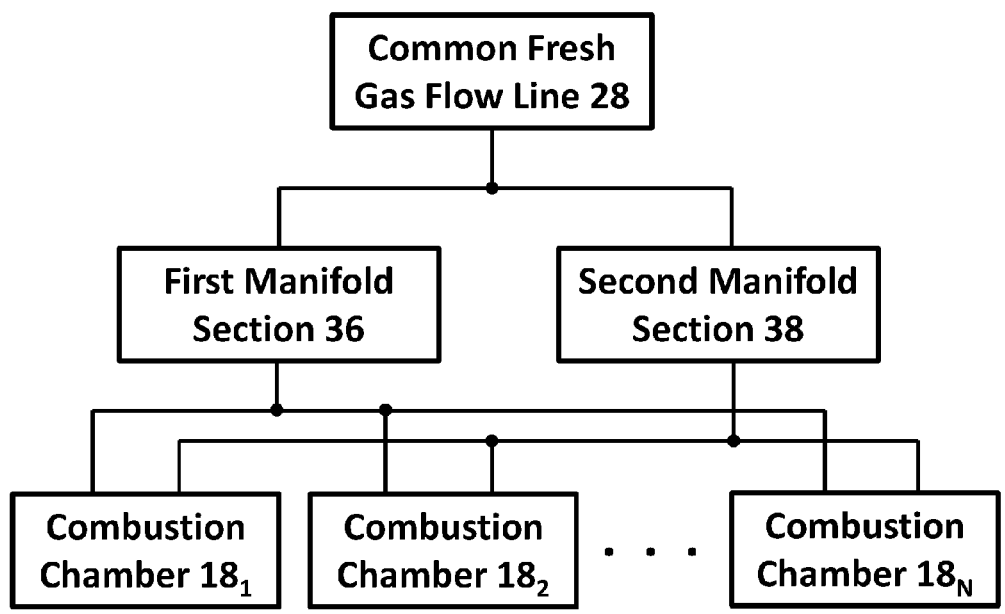
FIG. 2 shows an exemplary diagram of an intake device according to an aspect of the invention.

With reference to FIGS. 1 and 2, the intake device 10 can have a common fresh gas flow line 28 at its ingress area, which directly follows after the fresh gas inlet end 24 in flow direction GF of the fresh gas flow.

The common fresh gas line is divided at a separation point 30 into a first flow chamber 32 and a second flow chamber 34, which are completely fluidically separated from each other.

The first flow chamber 32 comprises at the same time a first manifold section 36, into which the part of the fresh gas flow FM1 flowing into the first collection chamber 32 is guided, and a plurality of outlet-side fresh gas lines 40, of which respectively one leads from the manifold section 36 to an allocated combustion chamber 18 of a cylinder 12 in the shown example. Depending on the number of available cylinders of the internal combustion engine, a different number of outlet-side fresh gas lines 40, as a rule a number corresponding to the cylinder number, can branch from the first manifold section 36.

The second flow chamber 34 can advantageously be basically configured similar to or even mirror symmetrical with respect to the first flow chamber 32. It can therefore comprise a second manifold section 38, in which the portion FM2 of the overall fresh gas flow GF flowing into the second flow chamber 34 is fed toward the internal combustion engine. In turn, from this second manifold section 38 outlet-side fresh gas lines 42 branch off to the individual combustion chambers 18 of the cylinders 20 of the internal combustion engine, wherein—just as for the outlet-side fresh gas lines 40—at least one outlet-side fresh gas line 42 is provided for each combustion chamber 18. Thus only the portion FMZ1 or FMZ2 apportioned to the respective cylinder, which flows fresh gas mass fluxes FM1 and FM2 through the first and second manifold section 32 or 34, is supplied within the outlet-side fresh gas lines 40 and 42.

For the sake of completeness it should be mentioned that an injection device for injecting fuel into the outlet-side fresh gas lines 40 and 42 can be provided inherently in the vicinity of the inlet valves 20 or 22 in a manner known. If a direct injection process is implemented in the internal combustion engine, however, the fuel can also be injected directly into the combustion chamber 18.

The inlet valves 20 and 22 are arranged at the fresh gas outlet end 44 of the intake device 10 in the shown example. While the fresh gas inlet end 24 of the intake device 10 can thus merely have one inlet opening 26 in the shown example, at least two outlet openings are provided at the fresh gas outlet end 44 for each cylinder of the internal combustion engine.

A fresh gas heat exchanger 46 is provided in the intake device 10 in order to cool the fresh gas feed to the internal combustion engine 13.

The fresh gas heat exchanger 46 can be forced through a separation wall 48, which fluidically separates the first and the second flow chamber 32 or 34, more precisely the first and the second manifold section 36 or 38. The fresh gas heat exchanger 46, for example, can be supplied with heat exchanger medium via a supply line 50 for heat exchanger medium, which can again be discharged from the fresh gas heat exchanger via a discharge line 52 for heat exchanger medium after the thermal energy has been absorbed.

In a first embodiment, the supply line 50 for heat exchanger medium can be provided in the area of a partial housing 54 of the intake device, which defines one of the flow chambers, here: the first flow chamber 32. The discharge line 52 for heat exchanger medium can likewise be provided in the area of the partial housing 56, which defines the other respective flow chamber, here: the second flow chamber 34. The heat exchanger medium flows in this case always through the entire fresh gas heat exchanger 46.

It can alternatively also be provided that each flow chamber of the first and second flow chamber 32 or 34 has its own partial fresh gas heat exchanger, to which heat exchanger medium is respectively delivered and from which it is again discharged. This alternative embodiment is indicated by dashed lines in FIG. 1 by means of the discharge line 51 for additional heat exchanger medium and the additional supply line 53 for heat exchanger medium. In this case only the partial fresh gas heat exchangers 46a or 46b positioned in the respective flow chamber can be operated separately from each other. Heat exchanger medium can be supplied for this purpose, if necessary, via the supply line 50 for heat exchanger medium and can again be discharged from the partial fresh gas heat exchanger 46a via the discharge line 51 for heat exchanger medium. Something similar applies for a partial fresh gas heat exchanger 46b and the corresponding lines 53 and 52.

The fresh gas heat exchanger 46 is arranged downstream of the separation point 30, but upstream of the outlet-side fresh gas lines 40 and 42 in the represented example.

It should be added that an outlet-side fresh gas line 40 and an outlet-side fresh gas line 42, which are allocated to the combustion chambers 18 in the represented example, form a fresh gas line group 58 for each combustion chamber 18.

The two outlet-side fresh gas lines 40 and 42 in this example serve for influencing the formation of an ignitable mixture in the combustion chamber 18. This functions in an already known manner as follows:

If fresh gas is supplied via the outlet-side fresh gas line 40 as well as also via the outlet-side fresh gas line 42 into the combustion chamber 18, the fresh gas flows relatively symmetrically into the combustion chamber 18, so that no noticeable vortex formation occurs with the ingress of the fresh gas flow into the combustion chamber 18. Then, however, if fresh gas flows into the combustion chamber 18 only via the lines, here: the outlet-side fresh gas line 42, the inward flow of fresh gas into the combustion chamber 18 takes place asymmetrically, which is sufficient for the formation of a spiral vortex with the stroke movement axis H of the piston 14 as helix axis. This type of vortex formation is also called "swirl process."

The intake device 10 is provided with an amount throttle device 60 and a vortex throttle assembly 62 for the purpose of influencing the further development.

The amount throttle device 60 is provided at the same time in the second manifold section 38, preferably upstream of the fresh gas heat exchanger 46. The effective flow cross section of the second flow chamber 34, and therewith of the fresh gas mass flow FM2 flowing through there can be modified at this point with a single device, for example, a throttle valve (FIG. 1 depicts a butterfly valve 64 as an example).

One advantage of the intake device according to the invention is likewise to arrange the vortex throttle assembly 62 in the manifold section, however here in the first manifold section 36, preferably again upstream of the fresh gas heat exchanger 46. A single device is thus also sufficient for the modification of the fresh gas mass flow FM1 in the first flow chamber 32 for the realization of the vortex throttle assembly 62. The latter can again be a butterfly valve 64, which can be identical to that of the amount throttle device 60. The butterfly valves 64 of the amount throttle device 60 or the vortex throttle assembly 62 can be rotated in a known manner around valve axes K60 or K62, which in the shown example run orthogonal to the drawing plane in FIG. 1.

If a vortex formation of the fresh gas in the combustion chamber 18 of the internal combustion engine is desired to support the formation of an ignitable mixture, the effective flow cross section in the first manifold section 36 is minimized at its attachment point by means of the vortex throttle assembly 62, so that fresh gas flows almost exclusively or even actually exclusively through the second flow chamber 34 past the inlet valve 22 into the combustion chamber 18 as a result of the above described vortex formation. The regulation of the fresh gas flow supplied to the internal combustion engine 13 takes place in this case exclusively via the amount throttle device 60.

If, instead, no vortex formation is desired in the combustion chamber 18, then the vortex throttle assembly 62 and the amount throttle device 60 are basically synchronously moved in the shown example in order to ensure that approximately identical fresh gas mass fluxes FM1 and FM2 flow through the respective flow chambers 32 and 34, so that fresh gas flows approximately symmetrically with reference to the stroke movement axis H of the piston 14 past the inlet valves 20 and 22 into the combustion chamber 18.

For this purpose, the respective control mechanisms for actuation of the vortex throttle assembly 62 and the amount throttle device 60, which are not represented in FIG. 1, can be synchronized for the operating state of vortex prevention by means of a synchronization device, which can be an engage able mechanical synchronized transmission, or an electronic synchronization control.

The expenditure for the manufacture and assembly needed to create an intake device suitable for vortex formation in combustion chambers and charge air cooling can be considerably reduced with respect to that of models of the prior art by means of the intake device 10 presented herein.

The invention claimed is:

1. An intake device for drawing in fresh gas and feeding the same to an internal combustion engine with internal combustion, wherein the intake device comprises:
   a fresh gas inlet end configured to be farthest from the internal combustion engine in a fully assembled state,
   a fresh gas outlet end configured to be nearest to the internal combustion engine in a fully assembled state,
   a fresh gas heat exchanger for transmission of thermal energy between the fresh gas and a heat exchanger medium flowing through the fresh gas heat exchanger provided between the fresh gas inlet end and the fresh gas outlet end,
   an inlet-side fresh gas line for feeding fresh gas from the fresh gas inlet end to the fresh gas heat exchanger,
   an amount throttle device comprising a valve and being configured for the purpose of modifying the amount of fresh gas, which flows per time unit from the fresh gas inlet end to the fresh gas outlet end during operation of the intake device,
   a plurality of combustion chambers,
   a plurality of separate outlet-side fresh gas lines configured for feeding fresh gas in the direction from the fresh gas heat exchanger to the plurality of combustion chambers, wherein a fresh gas line group is provided with at least two separate outlet-side fresh gas lines for each combustion chamber to be supplied with fresh gas by the intake device, and
   a vortex throttle assembly comprising a valve and being configured for the modification of the amount of fresh gas, which flows per time unit through a first part of the outlet-side fresh gas lines of each fresh gas line group during operation of the intake device,
      wherein an amount of fresh gas, which flows per time unit through a second part of the outlet-side fresh gas lines of each fresh gas line group, which is different from the first part, can be modified during operation of the intake device by actuating the amount throttle device,
      wherein a first manifold section, from which all first parts of the fresh gas line groups branch off to the fresh gas outlet end, and a second manifold section, from which all second parts of the fresh gas line groups branch off to the fresh gas outlet end, are fluidically separated from each other from a separation point on downstream to the fresh gas outlet end, such that from the separation point to the fresh gas outlet end the first manifold section and all other first parts of the fresh gas line groups form a first flow chamber and the second manifold section and all second parts of the fresh gas line groups form a second flow chamber, wherein the vortex throttle assembly is provided in the first manifold section and the amount throttle device is provided in the second manifold section.

2. The intake device according to claim 1,
   wherein the separation point is located upstream of the fresh gas heat exchanger, so that the inlet-side fresh gas line features a first partial fresh gas line as part of the first manifold section and a second inlet-side partial fresh gas line as part of the second manifold section, wherein the vortex throttle assembly is provided in the first partial fresh gas line and the amount throttle device is provided in the second partial fresh gas line.

3. The intake device according to claim 1,
   wherein the separation point is located upstream of the fresh gas heat exchanger, so that a heat exchanger housing that accommodates the fresh gas heat exchanger features a first partial housing, which is part of the first flow chamber, and a second partial housing, which is part of the second flow chamber.

4. The intake device according to claim 3,
   wherein the fresh gas heat exchanger features at least one heat exchanger surface for exchange of heat between the fresh gas and the heat exchanger medium, said surface is positioned in flow direction of the heat exchanger medium between a heat exchanger medium inflow into the heat exchanger housing and a heat exchanger medium outflow out of the heat exchanger housing, of which surface a first section is positioned in the first partial housing and a second section connected to the first section is positioned in the second partial housing.

5. The intake device according to claim 4,
   wherein the fresh gas heat exchanger has at least one line for transport of heat exchanger medium, which features a first line section extending in the first partial housing, a second line section extending in the second partial housing, and a connecting line section connecting the first and second line sections, wherein one line section out of the first and the second line section features the heat exchanger medium inflow, and the respective other line section features the heat exchanger medium outflow.

6. The intake device according to claim 3,
   wherein the first partial housing and the second partial housing have a shared separation wall.

7. The intake device according to claim 3,
   wherein the fresh gas heat exchanger comprises a first and a second partial fresh gas heat exchanger, of which each has at least one heat exchanger surface positioned in flow direction of the heat exchanger medium between a heat exchanger medium inflow into a partial housing and a heat exchanger medium outflow out of said partial housing for exchange of heat between the fresh gas and the heat exchanger medium, wherein the heat exchanger surface of the first partial fresh gas heat exchanger is positioned as first heat exchanger surface in the first partial housing and the heat exchanger surface of the second partial fresh gas heat exchanger is positioned as second heat exchanger surface in the second partial housing.

8. The intake device according to claim 1,
   wherein an amount actuation device for actuation of the amount throttle device as well as a vortex actuation device for actuation of the vortex throttle assembly are provided.

9. The intake device according to claim 1,
   further comprising a synchronization device, wherein the synchronization device is configured to ensure that the value of the ratio of the fresh gas flow speeds prevailing at the respective attachment points of the amount throttle device and the vortex throttle assembly at an operating time point is within a value range of no more than ±20% of the value of the ratio of the flow cross sections of the respective manifold sections prevailing at the respective attachment points of the vortex throttle assembly and the amount throttle device at the same operating time point.

10. A process of operating an intake device according to claim 1,
    comprising steps of regulating a fresh gas amount exclusively by actuating the amount throttle device, while the vortex throttle assembly minimizes the flow cross section of the first manifold section at its attachment point, if the formation of a vortex in an internal combustion engine connected on the side of the outlet end is desired, and regulating a fresh gas flow by means of the joint actuation of the vortex throttle assembly and the amount throttle device, if the formation of a vortex in the connected internal combustion engine is not desired.

11. The intake device according to claim 1, further comprising a synchronization device, the synchronization device is configured to ensure that the value of the ratio of the fresh gas flow speeds prevailing at the respective attachment points of the amount throttle device and the vortex throttle assembly at an operating time point is within a value range of no more than ±10% of the value of the ratio of the flow cross sections of the respective manifold sections prevailing at the respective attachment points of the vortex throttle assembly and the amount throttle device at the same operating time point.

12. The intake device according to claim 1, further comprising a synchronization device, wherein the synchronization device is configured to ensure that the value of the ratio of the fresh gas flow speeds prevailing at the respective attachment points of the amount throttle device and the vortex throttle assembly at an operating time point is within a value range of no more than ±5% of the value of the ratio of the flow cross sections of the respective manifold sections prevailing at the respective attachment points of the vortex throttle assembly and the amount throttle device at the same operating time point.

13. The intake device according to claim 1, wherein an amount actuation device for actuation of the amount throttle device as well as a vortex actuation device for actuation of the vortex throttle assembly are provided, and wherein a synchronization device is further provided, the synchronization device being configured for synchronization in the same direction of the actuation of the amount throttle device and the vortex throttle assembly in an operating condition, in which fresh gas flows in the first flow chamber as well as also in the second flow chamber toward the fresh gas outlet end.

* * * * *